Patented Oct. 21, 1930

1,779,390

UNITED STATES PATENT OFFICE

ALBERT M. CLIFFORD, OF AKRON, OHIO, ASSIGNOR TO THE GOODYEAR TIRE & RUBBER COMPANY, OF AKRON, OHIO, A CORPORATION OF OHIO

ANTIOXIDANT OR AGE RESISTER

No Drawing.   Application filed July 27, 1929. Serial No. 381,678.

This invention relates to methods of treating readily oxidizable organic compounds, and it has particular relation to methods of treating rubber, transformer oils and similar unsaturated hydrocarbons.

The object of the invention is to provide a method of treatment whereby the aging effects produced by exposure of the above-mentioned compounds to oxidizing agencies, such as air, are materially retarded.

Heretofore, it has been proposed to reduce the rate of oxidation and deterioration of rubber, transformer oils and similar materials by incorporating therein certain organic compounds, such as hydroquinone, reaction products of aldehydes and amines, and diphenylamine. These compounds, when incorporated into rubber in the usual manner upon the mill, do not appreciably affect the rate of vulcanization of the compound. however, they materially retard the rate of combination between the compounds and atmospheric oxygen, and as a result they increase the period of usefulness of the material. Unfortunately, most of the compounds heretofore suggested and tried as age-retarders or antioxidants have been objectionable either because their antioxidant properties were not sufficiently pronounced, or because they possessed certain undesirable characteristics, such as high toxicity or powerful and disagreeable odors, which rendered the task of handling them offensive. Also, some of them were solid materials having such high temperatures of fusion that they would not readily melt and blend with the rubber to form a uniform product.

This invention consists in the discovery that piperidine, a compound heretofore known as a powerful accelerator of vulcanization, and characterized by a penetrating and disagreeable ordor, is when combined or condensed with certain aryl hydroxides a highly efficient antioxidant. The reaction product of piperidine and alpha-naphthol is a specific example of a compound of this class which may be employed as an antioxidant with excellent results. This material may be prepared by intermixing molecular quantities of alpha-naphthol and piperidine, and then subjecting them to heat and pressure in an autoclave for a period of four to eight hours. During this time, the temperature should be maintained at about 260° to 290° C., and the pressure should rise to approximately 150 pounds per square inch. The reaction product is obtained from the autoclave as a dark viscous oil which may be purified by subjecting it to successive washings with dilute sodium hydroxide, water and dilute hydrochloric acid followed by a second washing with water. The product may then be further purified by subjecting it to distillation under reduced pressures. By use of this process, alpha-naphthyl piperidine having the formula

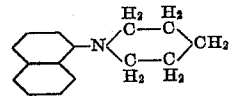

is obtained in relatively pure state. The material is characterized by a boiling point ranging from 180° to 220° C. when subjected to a pressure of 5 to 7 mm. of mercury. It is of oily consistency and is soluble in alcohol, ether and benzene, in which it produces a pronounced blue or violet fluorescence.

Beta-naphthyl piperidine may be prepared by the same method merely by substituting beta-naphthol for alpha-naphthol. When the reaction product is subjected to distillation at a pressure of 5 to 7 mm. of mercury it distills over at a temperature ranging from 170° to 270° C., and may be collected in two fractions, the first of which passes off at a temperature ranging from 170° to 210° C. This material is a solid of white or yellowish color. The second fraction which distills over at a temperature above 210° C. is, when cold, of tarry, almost resinous consistency. Both fractions are soluble in alcohol and benzene in which they produce a marked blue fluorescence.

The invention is not limited to the reaction products of piperidine with alpha and beta-naphthol, but also includes reaction products of piperidine and various substituted naphthols, such as alpha-chlor naphthol and similar materials. These compounds may be prepared by methods analogous to those above described.

Although the compounds may be used with excellent results in substantially all of the standard rubber compounds, the following is a formula of a material whose use has been found by experiment to produce particularly satisfactory products:

| | Parts |
|---|---|
| Acetone extracted rubber | 100 |
| Zinc oxide | 5 |
| Sulphur | 3 |
| Stearic acid | 1.5 |
| Hexamethylene tetramine | 1 |
| Antioxidant | 1 |

In order to test the invention, samples of rubber in which alpha-naphthyl piperidine and beta-naphthyl piperidine were employed as antioxidants were vulcanized, and were then subjected to various physical tests designed to ascertain their age-resisting properties. In conducting these tests, the samples were divided into two groups, the first of which was subjected to physical tests in order to ascertain their tensile strength and elasticity prior to aging. The second set of samples was first weighed, after which the samples were placed in an oxygen bomb where they were artificially aged for a period of six days at a temperature of 50° C. and in oxygen at a pressure of 150 pounds per square inch. After the completion of this period of aging, the samples were removed and weighed in order to ascertain the per cent of oxygen absorbed. They were then subjected to physical tests identical with those conducted upon the unaged samples. The results of these various tests are tabulated as follows:

| Cure in mins. at 40# pressure | Tensile strength kgs/cm² | Per cent elong. at break | Load in kg.s/cm.² at | | Per cent weight increase |
|---|---|---|---|---|---|
| | | | 500% elong. | 700% elong. | |
| ALPHA-NAPHTHYL PIPERIDINE | | | | | |
| ORIGINAL | | | | | |
| 20 | 70 | 980 | 7 | 16 | |
| 35 | 114 | 900 | 12 | 38 | |
| 50 | 138 | 820 | 19 | 68 | |
| AGED | | | | | |
| 20 | 66 | 890 | 8 | 22 | .12 |
| 35 | 109 | 810 | 15 | 57 | .30 |
| 50 | 140 | 790 | 21 | 83 | .41 |
| BETA-NAPHTHYL PIPERIDINE | | | | | |
| ORIGINAL | | | | | |
| 20 | 80 | 980 | 7 | 19 | |
| 35 | 113 | 905 | 13 | 36 | |
| 50 | 147 | 835 | 19 | 66 | |
| AGED | | | | | |
| 20 | 75 | 910 | 11 | 25 | .06 |
| 35 | 113 | 855 | 16 | 48 | .23 |
| 50 | 127 | 790 | 22 | 76 | .29 |

From these tables it will be apparent that compounds containing the antioxidants absorbed only small percentages of oxygen. Also, the original strength and elasticity of the rubber was maintained to a remarkable degree. Samples of rubber containing no antioxidant, when subjected to a similar period of artificial aging, are reduced to resinous masses which are substantially devoid of tensile strength and elasticity.

The reaction products of the various naphthols and piperidine are relatively easy to prepare. Also, they blend with ease with the rubber to produce products of exceptional uniformity. Furthermore, the odor thereof is slight and not offensive. For these reasons, the compounds are highly desirable as antioxidants in rubber. They also may be employed with excellent results as antioxidants in transformer oils or other organic compounds which are subjected to oxidation under ordinary conditions.

Although I have described in detail only the preferred forms of the invention, it will be apparent to those skilled in the art that the invention is not so limited, but that various modifications may be made therein without departing from the spirit of the invention or from the scope of the appended claims.

What I claim is:

1. A method of preserving rubber which comprises subjecting it to vulcanization in the presence of a reaction product of piperidine and a naphthol.

2. A method of preserving rubber which comprises subjecting it to vulcanization in the presence of naphthyl piperidine.

3. A method of preserving rubber which comprises subjecting it to vulcanization in the presence of beta-naphthyl piperidine.

4. A method of preserving rubber which comprises subjecting it to vulcanization in the presence of a material having the following formula:

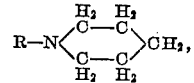

in which R is a naphthyl group.

5. A method of preserving oxidizable organic compounds which comprises incorporating therein a reaction product of a naphthol and piperidine.

6. A method of preserving oxidizable organic compounds which comprises incorporating therein a reaction product of piperidine and beta-naphthol.

7. A rubber product that has been vulcanized in the presence of a reaction product of a naphthol and piperidine.

8. A rubber product that has been vulcanized in the presence of a reaction product of beta-naphthol and piperidine.

9. A rubber product that has been vulcanized in the presence of a condensation product of piperidine and a naphthol.

10. A rubber product that has been vulcanized in the presence of a condensation product of piperidine and an alpha-naphthol.

11. A rubber product that has been vulcanized in the presence of a condensation product of piperidine and a beta-naphthol.

12. A method of preserving rubber which comprises subjecting it to vulcanization in the presence of a reaction product of piperidine and a material selected from a class comprising beta naphthol, alpha naphthol and chlor naphthol.

13. A method of preserving rubber which comprises subjecting it to vulcanization in the presence of alpha-naphthyl piperidine.

14. A method of preserving oxidizable organic compounds which comprises incorporating therein a reaction product of piperidine and alpha-naphthol.

15. A rubber product that has been vulcanized in the presence of a reaction product of alpha-naphthol and piperidine.

16. A rubber product that has been vulcanized in the presence of a condensation product of piperidine and chlor-naphthol.

In witness whereof, I have hereunto signed my name.

Signed at Akron, in the county of Summit and State of Ohio, U. S. A., this 26th day of July, 1929.

ALBERT M. CLIFFORD.